United States Patent
Wallevik et al.

[11] Patent Number: 5,167,700
[45] Date of Patent: Dec. 1, 1992

[54] METHOD AND APPARATUS FOR REMELTING AND REFINING OR MAGNESIUM AND MAGNESIUM ALLOYS

[75] Inventors: Oddmund Wallevik; Jan B. Ronhaug, both of Porsgrunn, Norway

[73] Assignee: Norsk Hydro A.S., Oslo, Norway

[21] Appl. No.: 779,911

[22] Filed: Oct. 21, 1991

[30] Foreign Application Priority Data

Oct. 24, 1990 [NO] Norway ............................ 904597

[51] Int. Cl.[5] ............................................. C04B 35/60
[52] U.S. Cl. ........................................ 75/594; 75/10.65; 75/595
[58] Field of Search ....................... 75/594, 595, 10.65

[56] References Cited

U.S. PATENT DOCUMENTS

| | | | |
|---|---|---|---|
| 2,170,863 | 8/1939 | Junker | 75/594 |
| 3,661,737 | 5/1972 | Scherer | 75/594 |
| 3,907,962 | 9/1975 | Ogiso | 266/200 |

Primary Examiner—Peter D. Rosenberg
Attorney, Agent, or Firm—Wenderoth, Lind & Ponack

[57] ABSTRACT

A and apparatus for melting and refining of magnesium and magnesium alloys is used both for melting of ingots and remelting of return metal. Metal is melted by pumping an overheated salt melt from a heating zone in a salt melt furnace and distributing it over the metal, which is placed in a basket above the liquid level in the furnace. The metal melts and is immediately removed from the basket without being further heated. A melt composition rich in calcium chloride with a content of calcium fluoride is preferably used.

19 Claims, 3 Drawing Sheets

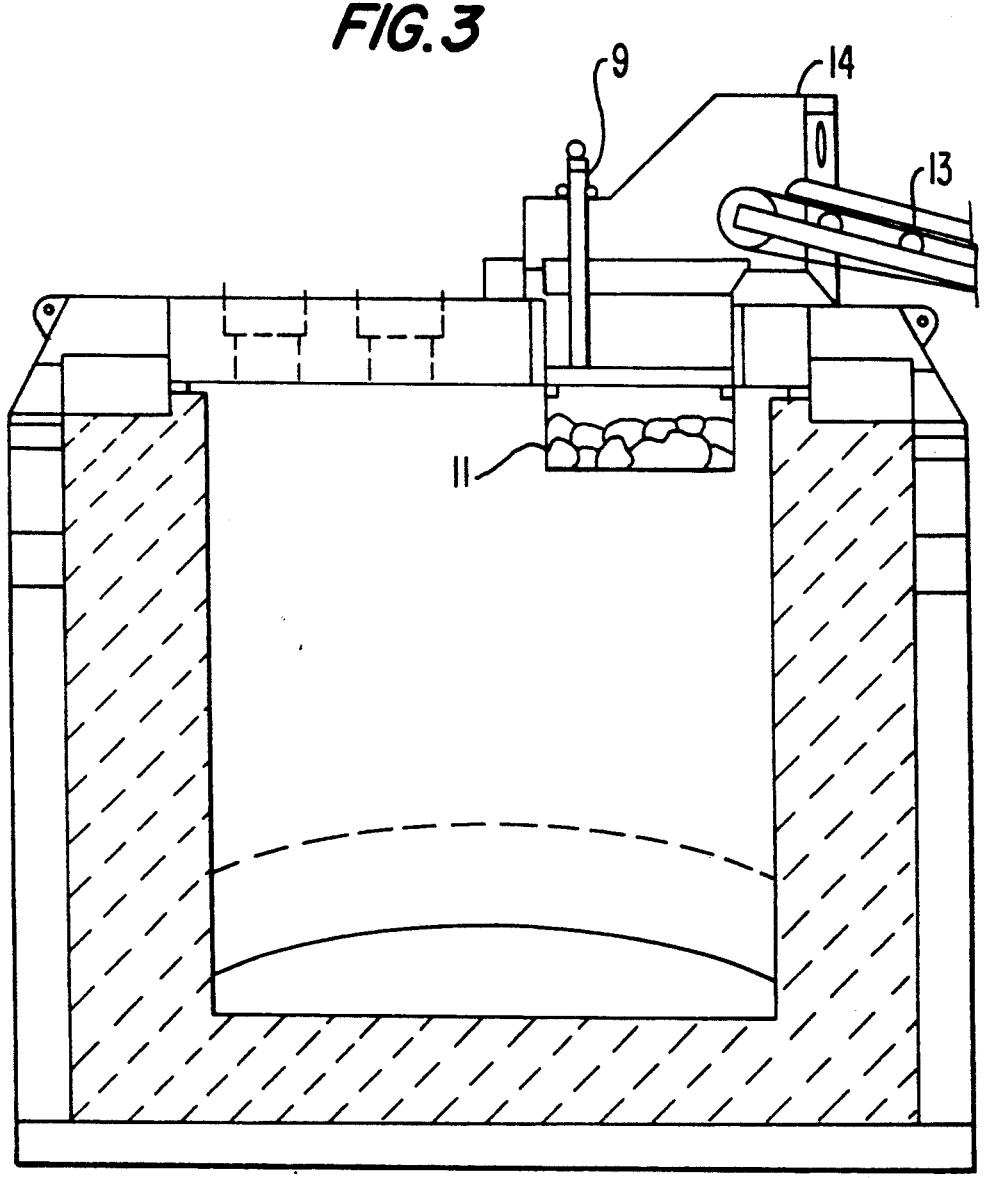

METHOD AND APPARATUS FOR REMELTING AND REFINING OR MAGNESIUM AND MAGNESIUM ALLOYS

BACKGROUND OF THE INVENTION (1) Field of the Invention

The invention concerns a method and an apparatus for remelting and refining of magnesium and magnesium alloys. The invention could be used both for the melting of ingots and the remelting of returned metal. The returned metal could for example comprise casting returns, scrap metal, and chips.

(2) State of the Prior Art

Today most the remelting and refining of magnesium ingots/scrap is done discontinously in a heated steel crucible. A flux is added and melted and thereafter the metal is gradually charged. As the metal melts, there will be formed a layer of molten metal above the flux. Magnesium metal which is added thereafter will come into direct contact with the molten metal. If the metal contains humidity this could cause an explosion. To avoid this all metal which should be melted is heated before-hand to be sure that it does not contain humidity. In addition it is usual to spread flux over metal scrap/ingots to be charged. A disadvantage with this is that all flux charged forms sludge giving metal loss and deposition problems. In addition the process demands a great energy supply both for the preheating of metal and the melting, because it is necessary to heat well above the melt temperature for the metal. Further, the method gives unpleasant working conditions for the operators exposed to heat and gases from the melt.

From Norwegian patent No. 147 606 is known a method and a furnace for continuously refining molten magnesium. Molten magnesium is charged beneath the metal surface in the chamber. A furnace is used with several precipitation chambers for magnesium and collection chambers for salt melt. This furnace gives a good refining of the metal, but is adapted to be charged with molten metal.

OBJECTS OF THE INVENTION

The object of the invention is thus to develop a method and apparatus which can be used for continuously remelting and refining of metal, especially magnesium and magnesium alloys. It is essential that both scrap metal and ingots can be used. A further object is to obtain a method which demands a low energy supply and gives a high yield without great sludge formation and metal loss.

These and other objects of the invention are obtained with the method and apparatus which are described below.

SUMMARY OF THE INVENTION

The invention is based on the use of a salt melt for remelting and refining magnesium and magnesium alloys. All sorts of return metal and scrap can be treated. The metal is melted by pumping an overheated salt melt from a chamber in a salt melt furnace and sprinkling this over the metal which is placed in a basket above the fluid level in another chamber in the furnace. The metal melts and flows directly down into the chamber without being further heated. No heating of metal is done without covering with melt, which gives good oxidation protection. The density difference between melt and metal is kept at 0.1–0.4 g/cm$^3$. Preferably a salt melt with a high content of calcium chloride (26–80%) and with a content of 1–10% calcium fluoride is used. The melt has a circulation rate of 5–30 tons melt per ton magnesium, and especially preferred is 7–20 tons melt per ton magnesium. To melt 2–3 tons per hour is a typical value. A furnace with a plurality of chambers for refining and stay of the metal is used. By melting scrap of unknown origin a separate chamber in the furnace makes it possible to perform further refining and adjustments before the metal is mixed with the rest of the metal or is removed from the furnace.

BRIEF DESCRIPTION OF THE DRAWINGS

The invention will be further described below with reference to the enclosed drawings, wherein:

FIG. 3 is a sectional view taken along line 3—3 in FIG. 2.

DETAILED DESCRIPTION OF THE PREFERED EMBODIMENTS

Figure 1:
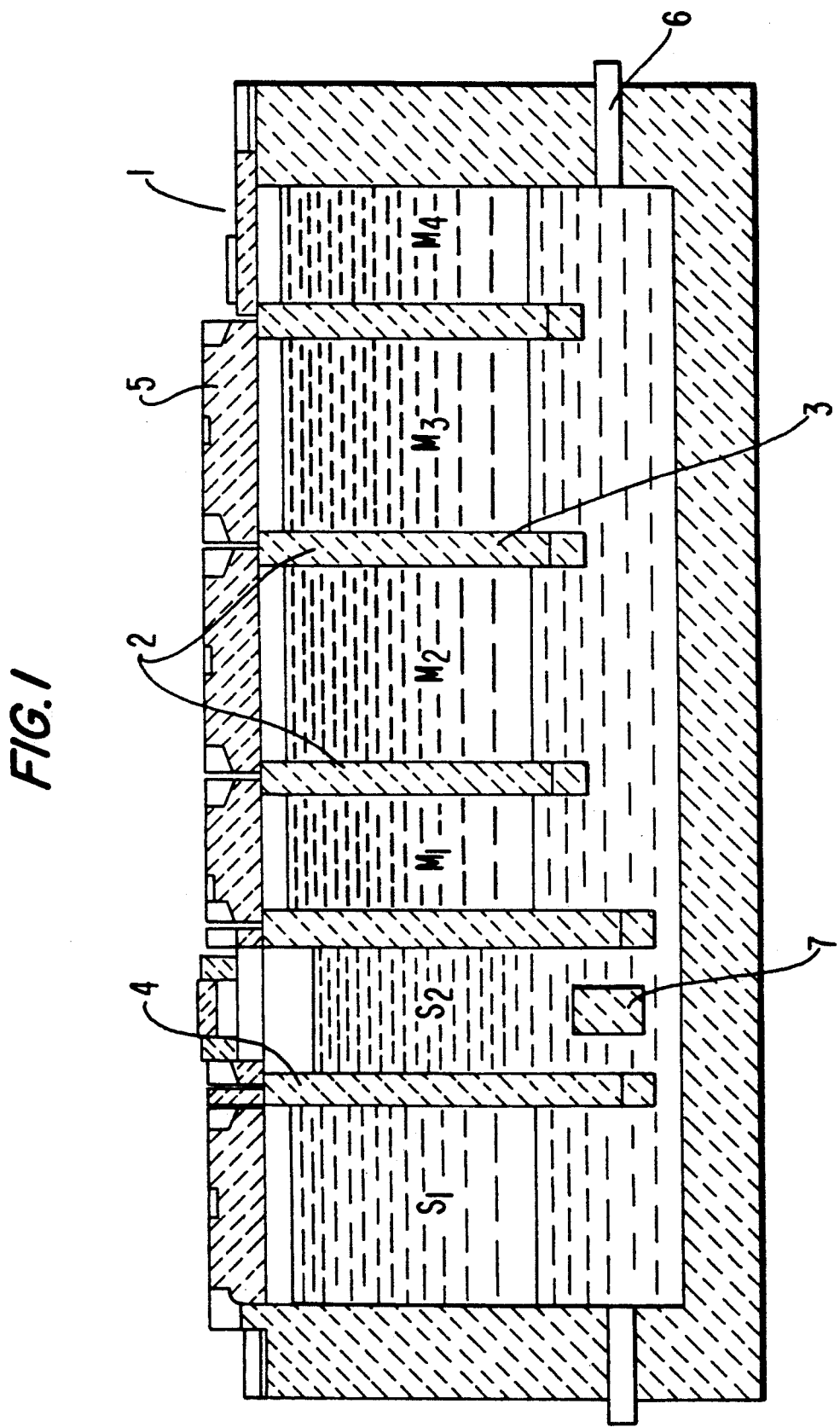
FIG. 1 shows a sectional side view of a furnace according to the invention.

FIG. 1 shows a furnace with four metal collecting chambers M1–M4 and two salt melt chambers S1 and S2. Chamber S1 is twice as big as the normal salt melt chamber S2, and thus giving a large liquid magnesium buffer capacity. The furnace is made of a refractory material and the metal collecting chambers are separated by refractory partition walls 2 with openings 3. The salt melt chamber S1 is separated from a continuous molten magnesium phase in the furnace by a impermeable partition wall 4. The furnace is covered by a lid 5. The number of chambers in the furnace is optional and must be adapted to the requirements of a particular situation. The furnace must have at least two chambers for normal remelting and at least three if scrap of unknown origin is melted.

The furnace is heated by alternating current electrodes 6 which are placed in accordance with localized power demand. Power electrodes 7 are placed in the salt melt chamber S2, which forms a heating zone, and thereby provides overheated liquid salt melt to the melting process. The hatched areas indicated molten metal, while the unhatched show salt melt.

Figure 2:
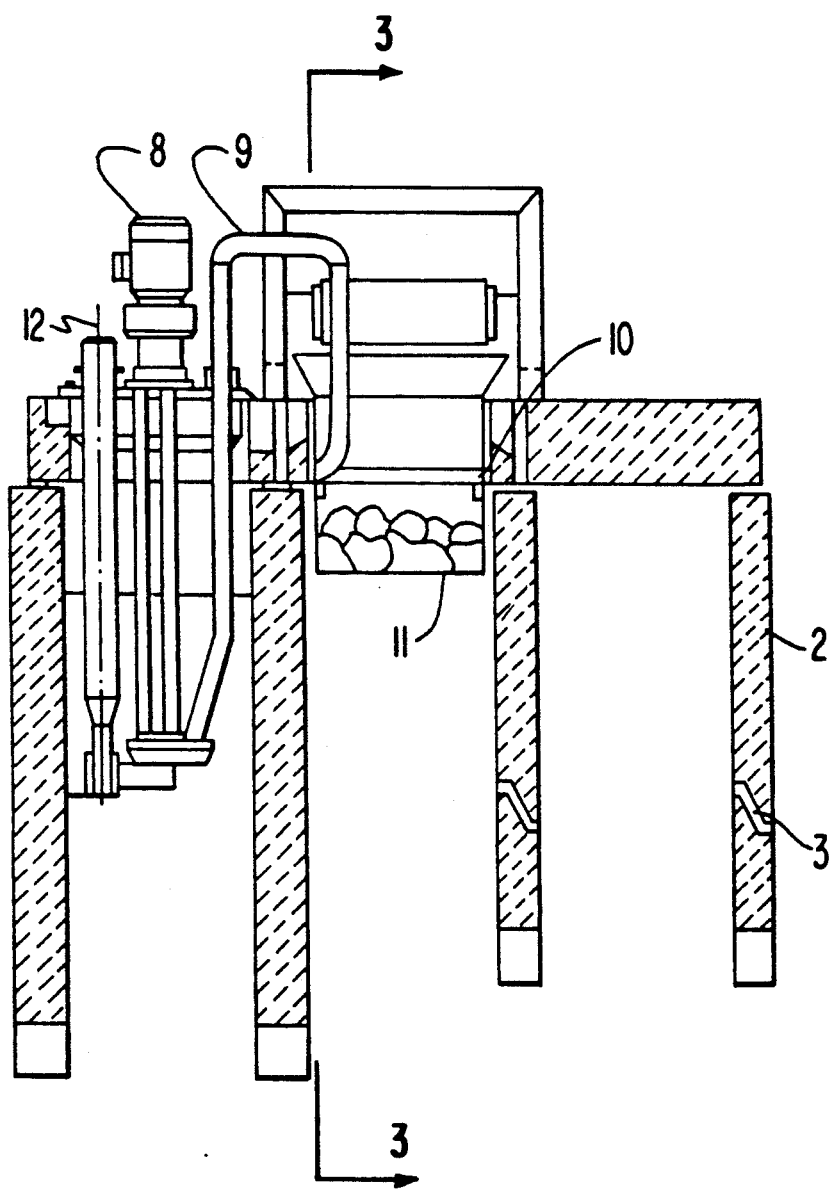
FIG. 2 shows a supply system for melt and metal raw material.

In FIG. 2 a change system for melt and raw material is shown. This consists of the following main components: a pump 8 for liquid salt melt, a supply pipe 9, a sprinkling arrangement for melt 10 and a holder comprising a perforated basket 11 at a melting zone or station for metal that is going to be melted. The bottom of the basket is situated above the fluid level in the furnace. The salt melt pump is placed in chamber S2, but is equipped with transfer pipes which make it possible to charge salt melt to a basket placed either in S1 or M1. Also shown is a supply arrangement 12 for eventual supply of manganese chloride for direct production of high purity alloys by remelting.

FIG. 3 shows a section along line 3—3 in FIG. 2. Here the change system for metal is further shown. A conveyor belt 13 is continuously charging magnesium ingots or scrap to the metal melting basket 11. The apparatus can be equipped with a vent system 14, especially suitable if oil containing scrap is melted.

The invention is based on the use of salt melt for the remelting of the metal. The metal is melted by contact with an overheated salt melt so that the necessary energy for heating and melting is transferred from melt to metal. For melting alloys there is, for example, used a melt heated to about 100° C. above the melt temperature. The degree of overheating is varied dependent on what is melted and the wanted melting rate. Because of the alternating current heating heat is generated directly in the melt. This gives a very large efficiency, about 90%, compared to about 43% by induction heating. This heating method gives much greater effect/volume than other kinds of heat transfer. A typical value is 1 MW per cubic meter.

It is important that a density difference of 0.1–0.4 g/cm$^3$ between melt and metal is maintained to give a good separation between metal and melt. Preferably salt melts are used with a density difference of 0.2–0.3 g/cm$^3$ to the liquid metal.

A melt composition rich in calcium chloride and with a content of calcium fluoride is preferably used. Melts with a content of 25–80% calcium chloride and 1–10% calcium fluoride are of common use. Melts with a content of 40–60% calcium chloride and 3–7% calcium fluoride are preferred. The rest of the melt can consist of sodium chloride and magnesium chloride, but also a considerable content of potassium chloride can be used. Also, melt compositions containing barium chloride can be used to achieve the wanted density difference.

The metal which one has a need to melt can, be of different sorts. When well defined, known scrap can be melted and the melt basket 11 is placed in chamber M1. The salt melt is pumped from the chamber S2 via pump 8, transfer pipe 9 and sprinkler 10. Hot salt melt is sprinkled over the metal scrap which gradually melts. To distribute the melt in the best possible way over the metal the sprinkler is shaped as a rectangular frame. The melt is thereby spread from all four sides in several rows of apertures and downwards to the metal. The great contact area between metal and melt causes an efficient heat transfer. The salt melt has poor thermal conductivity. It is essential that the temperature difference for the salt melt is small and that the temperature difference between melt, and metal is large. Concerning the temperature difference for the salt melt, the circulation rate is important. This should be on the order of 5–30 tons of melt per ton magnesium which is melted. It is preferred to use 7–20 tons of melt per ton magnesium. A typical value is 13 tons salt per ton magnesium and to melt 2–3 ton magnesium per hour.

This melting method also gives good oxidation protection. All the metal or scrap will be covered by salt. The melt spreading results in rapid melting, which leads to that the metal will not stay heated for a long time. Molten metal drips/flows continuously down into the metal chamber. There is not taking place any heating of material which is not covered by salt, and thereby oxidation is avoided. It is also not necessary to preheat the metal which shall be melted. Eventual humidity has no importance, because solid and liquid metal never is mixed.

The method also gives an ideal refining effect when metal is melted by sprinkling with salt melt. During the refining process it is important to separate oxides and metal. The oxides are at the metal surface and these are efficiently removed by the salt and are led to the salt melt and are thereby separated from the metal (by conventional melting both oxide and metal are mixed into the metal phase). As soon as the metal is melted, it flows out of the basket. The residence time for liquid metal in the basket is very short and the metal leaves the basket at melting temperature. The metal is heated only slightly above the fusion point which leads to the intermetallic particles precipitating immediately. For production of very pure alloys, manganese salt can be supplied directly by melting. The basket 11 which is used for melting is made of ordinary steel, but at the fusion point of magnesium or magnesium alloys the solubility of iron is so small that this will not contaminate the metal.

During the process liquid metal will flow via the openings 3 in the partition walls 2 through the following chambers and to the outlet end M4 where it can be removed by, for example, a centrifugal pump or vacuum wagon. During the slow calm transfer from chamber to chamber in the salt melt furnace furnace solid non metallic impurities which have been wetted by the salt will be precipitated and collected at the bottom of the furnace, from where they can be removed.

For melting scrap of unknown composition, the metal is charged to the basket 11 located in chamber S1. By melting the metal in chamber S1, one has the possibilities of sampling, further refining, adjusting of salt melt, alloying with other metals, etc. When the composition, purity, etc. for the metal in the chamber S1 is found acceptable, the contents can be transferred to the chamber M1 or to another unit in the foundry for further use. Scrap can contain, for example, screws, bushings, etc., made of copper or nickel which at common remelting processes completely will destroy all the metal. By the use of metal remelting by use of salt melt, such objects will be left back in the basket. Nickel and copper is completely resistant to salt melt, and as the liquid metal is removed immediately, this will not be polluted.

One also has the opportunity of melting oil containing metal scrap, for example machining chips. The oil will evaporate and catch fire, and reburning in a gas system will be necessary. The amounts of oil which can be tolerated will be dependent on the capacity for gas cooling and cleaning.

The invention will be further described by the following examples:

EXAMPLE 1

All together 325 kg metal chips of AZ91 magnesium alloy were melted. A salt melt was used consisting of 57% CaCl$_2$, 31.1% NaCl, 4.5% KCl, 3.5% MgCl$_2$ and 3.5% CaF$_2$. The chips were spread over 6 barrels. By remelting one measured melting rate for four of the six barrels with chips. The measurements varied in the area of 3360 kg/hour to 6000 kg/hour with melting times of 40–45 sec. per dish. See table 1.

TABLE 1

| Measurement of remelting rate for chips AZ91. | | | | | |
| --- | --- | --- | --- | --- | --- |
| Type | Barrel No. | Time Kg | s | Kg/hour | Melting temperature °C. | Size mm |
| AZ91 | 2 | 65 | 45 | 5200 | 763–743 | w = 0.5–4.5 l = 4–17 |
| AZ91 | 3 | 42 | 40 | 3360 | 765–760 | Mixture, short + long |
| AZ91 | 5 | 49 | 40 | 3920 | 770–759 | w = 0.5–2.5 l = 2,5–6 |
| AZ91 | 6 | 75 | 45 | 6000 | 770–752 | w = 0.5–3 l = 2–4 |

In barrel numbers 5 and 6 the chips were finely divided. The experiments were carried out satisfactorily without any formation of dispersed metal in the melt. After melting the bath of melt contained 0.053% Mg and 0.049% MgO.

EXAMPLE 2

Experiments were carried out with scrap alloy remelting to measure sludge formation. In all 8500 kg casting returns of AZ91 were charged batchwise the basket to until 1 m above the sprinkler. As the metal melted and flew out of the perforated basket, the casting parts sunk downwards. The melting temperature sank from 770°-780° C. to about 700° C. while the melting took place. The content of calcium chloride in the circulating melt was 45.7-44.2% and the content of calcium fluoride varied from 2.75-2.4%. The content of MgO varied between 0.04 and 0.65% and the content of Mg had a variation between 0.027 and 3.43%. The formation of sludge was 70.6 kg sludge per ton magnesium metal. The sludge contained 11.5 kg Mg per ton of melted Mg. The content of MgO in the sludge was 14.9 kg per ton of melted magnesium.

Metal loss mechanically bound in the sludge by use of pure start material is 0.1-0 2% of product weight. By melting very corroded, humid alloy chips one obtained 3-5% mechanically bound magnesium in the sludge. With a cheaper quality of relatively dry chips one obtained 0.6% metal loss. In addition the metal loss includes metallic magnesium which forms compounds during the melting process. When heavy, pure magnesium products are melted the oxide content in the salt is about 0.2%, for chips the content is about 0.6%.

By melting and refining alloy scrap an average recovery percentage will be 98-99.5%, dependent on the scrap quality. One can calculate a further loss if manganese chloride is added to produce an extra pure product. Metallic magnesium is consumed as it reduces manganese chloride to metallic manganese as the operative component to precipitate iron. The amount of manganese chloride necessary is proportional to the iron content in the alloy.

For comparison, one can mention that by conventional melting in an externally heated steel crucible, one has a metal yield in the range 88-94%. For an induction furnace with a ceramic crucible and an efficient use of flux, the yield can reach 95-96%. All melting in crucible furnaces give greater amounts of sludge because of greater melting loss of Mg, greater flux consumption, batchwise remelting by charge and short contact time between sludge/melt and liquid metal. A typical amount of sludge by conventional remelting is 170 kg per ton of molten metal.

By this invention one is able to remelt a great range of return metal of magnesium alloys with a high recovery percentage for the metal. A rapid remelting and removal of liquid metal prevents oxidation. No heating of metal is taking place without covering by melt and there is no contact between solid and liquid metal. This make it possible also to use metal with a certain humidity content without previous heating. The process gives a good energy utilization with heat generating directly in the melt and circulation of melt. Also scrap of unknown origin can be remelted in the same furnace as impure melts can be separated from the rest of the metal in the furnace.

We claim:

1. A method of remelting and refining metals or alloys comprising:
   providing a furnace having a molten salt mixture therein, said furnace having a lower portion, a heating zone and a melting zone above the fluid level in said furnace;
   providing a metal or alloy to be melted in said melting zone;
   circulating said molten salt mixture from said lower portion of said furnace through said heating zone to said melting zone; and
   distributing said molten salt mixture over the metal or alloy in said melting zone above the fluid level in the furnace so as to melt the metal or alloy and remove the metal or alloy from said melting zone.

2. The method of claim 1, wherein a density difference between the metal or alloy and the molten salt mixture of 0.1-0.4 g/cm$^3$ is maintained.

3. The method of claim 2, wherein said density difference is maintained at 0.2-0.3 g/cm$^3$.

4. The method of claim 1, wherein said molten salt mixture comprises 25-80% calcium chloride and 1-10% calcium fluoride.

5. The method of claim 4, wherein said molten salt mixture comprises 40-60% calcium chloride and 3-7% calcium fluoride.

6. The method of claim 1, wherein said molten salt mixture is circulated at a rate of 5-30 tons of molten salt mixture per ton of metal or alloy melted.

7. The method of claim 6, wherein said molten salt mixture is circulated at a rate of 7-20 tons per ton of metal or alloy melted.

8. The method of claim 1, wherein said molten salt mixture is directly heated by alternating current.

9. The method of claim 1, wherein:
   said step of providing said furnace comprises providing a perforated basket at said melting zone above the fluid level in said furnace;
   said step of providing a metal or alloy comprises placing the metal or alloy in said perforated basket; and
   said step of distributing comprises distributing said molten salt mixture over the metal or alloy in said perforated basket so that the melted metal or alloy runs through said perforated basket to the fluid in said furnace.

10. The method of claim 9, wherein said step of providing said furnace further comprises providing a sprinkler over said perforated basket and said step of distributing further comprises distributing said molten salt mixture over the metal or alloy with said sprinkler.

11. The method of claim 1, wherein:
    said step of providing a furnace comprises providing a plurality of chambers in said furnace, a first said chamber having said molten salt mixture and said heating zone therein, and a second said chamber having said melting zone therein, both said chambers communicating with each at said lower portion of said furnace; and
    said step of circulating comprises delivering said molten salt mixture from the first said chamber to said melting zone.

12. An apparatus for remelting and refining metals or alloys, comprising:
    a refractory-lined furnace having a bottom surface and a plurality of vertical partition walls dividing said furnace into at least two chambers, each said vertical partition wall having a lower edge spaced above said bottom surface;

a heater in said furnace for heating a salt mixture in one of said chambers;

a metal or alloy melting station located at the top of another said chamber so as to be spaced above the fluid level therein; and a molten salt mixture transfer device for transferring the molten salt mixture from the one said chamber to said melting station.

13. The apparatus of claim 12, wherein said heater comprises a plurality of alternating current electrodes.

14. The apparatus of claim 12, wherein:

said furnace has at least three said chambers, a third said chamber being separated from the remaining said chambers by a said vertical partition wall that is impermeable and has a lower edge above said bottom surface; and a second melting station is at the top of said third chamber and has a holder for holding an impure metal or alloy above the fluid level in said third chamber.

15. The apparatus of claim 12, wherein said melting station has a holder for holding the metal or alloy above the fluid level in the another said chamber.

16. The apparatus of claim 15, wherein the one said chamber has a pump for pumping the salt mixture therefrom to said holder at said melting station.

17. The apparatus of claim 15, wherein said holder is a perforated basket.

18. The apparatus of claim 15, wherein said holder has a sprinkler thereover for distributing the salt mixture over the metal or alloy in said holder.

19. The apparatus of claim 12, and further comprising a feeder for feeding metal or alloy to said melting station.

* * * * *